United States Patent [19]

Fisher

[11] Patent Number: 4,910,750
[45] Date of Patent: Mar. 20, 1990

[54] DATA TRANSMISSION SYSTEM

[75] Inventor: David A. Fisher, Saffron Walden, Great Britain

[73] Assignee: STC PLC, London, United Kingdom

[21] Appl. No.: 282,105

[22] Filed: Dec. 8, 1988

Related U.S. Application Data

[63] Continuation-in-part of Ser. No. 180,633, Apr. 4, 1988, abandoned, which is a continuation of Ser. No. 919,038, Oct. 15, 1986, abandoned.

[30] Foreign Application Priority Data

Dec. 5, 1985 [GB] United Kingdom ............... 8529988

[51] Int. Cl.$^4$ .................................... H03M 5/16
[52] U.S. Cl. ................................ 375/19; 371/56; 341/57; 375/20
[58] Field of Search .............. 375/17, 19, 20; 371/37, 371/47, 55, 56, 57, 37.8, 47.1, 57.1; 360/39, 40; 341/56, 57, 58

[56] References Cited

U.S. PATENT DOCUMENTS

| | | | |
|---|---|---|---|
| 3,302,193 | 1/1967 | Sipress | 341/57 |
| 3,418,631 | 12/1968 | Sipress et al. | 371/56 |
| 3,611,141 | 10/1971 | Waters | 375/19 |
| 3,754,237 | 8/1973 | Meux | 375/19 |
| 3,866,147 | 2/1975 | De Couveur et al. | 375/19 |
| 4,003,041 | 1/1977 | Duuren et al. | 375/19 |
| 4,502,143 | 2/1985 | Kato et al. | 371/57 |
| 4,520,346 | 5/1985 | Shimada | 360/40 |
| 4,539,675 | 9/1985 | Fisher | 370/32 |

Primary Examiner—Benedict V. Safourek
Attorney, Agent, or Firm—Lee, Mann, Smith, McWilliams & Sweeney

[57] ABSTRACT

The system uses a 3B2T line code, i.e. one in which sets of three or triplets of binary digits are converted into pairs or duplets of ternary elements. All nine of the possible ternary duplets are used, in such a way that the same ternary duplet does not occur twice consecutively. This is done in one version by using the ninth duplet 00 as a repeat indicator, and in the other version by a conversion process in which each conversion operation takes into account the result of the preceding operation.

14 Claims, 5 Drawing Sheets

DATA TRANSMISSION SYSTEM

RELATED APPLICATIONS

This application is a continuation-in-part of U.S. patent application Ser. No. 180,633, filed Apr. 4, 1988, which in turn is a continuation of U.S. patent application Ser. No. 919,038, filed Oct. 15, 1986, both now abandoned.

BACKGROUND OF THE INVENTION

This invention relates to a data transmission system in which the data to be transmitted is expressed in a binary code which is converted into a ternary line code before transmission.

An example of such a ternary code is described in U.S. Pat. No. 3,611,141 (D. B. Waters), where the code is of the 4B3T type, which means that successive groups each of four binary elements (or bits) are converted for transmission into groups of three ternary elements. Another example of such a code is the equally well-known 3B2T line code.

British Published Application No. 2014401A (Hitachi) describes a data transmission system in which a line code for transmitting intelligence in binary form is described, and which uses three different line levels. Thus it is a pseudo-ternary line code. Two of the levels are used to convey the two binary conditions, 1 and 0, while the third level, referred to as level $\emptyset$, is used as a "repeat indicator". Thus if a succession of 1 digits have to be sent, they are sent as 1, $\emptyset$, 1, $\emptyset$. . .; similarly if a succession of 0 digits have to be sent, they are sent as 0, $\emptyset$, 0, $\emptyset$,. . . What this means is that a succession of digits of the same binary signification is conveyed as an alternacy of the line level for that binary signification and the third ($\emptyset$), or "repeat indicating" level.

It will be noted that in this system the number of three level, or pseudo-ternary, elements which are sent is the same as the number of binary elements in the original message.

Another line code of some interest is described in U.S. Pat. No. 3,418,631 (Sipress et al), in which the input signal is split into two-bit binary words and then encoded for transmission into three-level signals according to either of two codes. This is called a specially constrained code, and is also described in U.S. Pat. No. 3,302,193 (Sipress). U.S. Pat. No. 4,502,143 (Kato et al) describes a line code arrangement in which the object is to reduce the number of consecutive identical digits to a reasonably low level. In addition, a number of other known line codes are described. A final document of interest is U.S. Pat. No. 4,520,346 (Shimoda) which relates to an NRZI (non-return to zero inverted) code format.

SUMMARY OF THE INVENTION

An object of the invention is to produce a system which uses an improved version of such a line code.

According to one aspect of the invention, there is provided a data transmission system, which includes:

an input over which data is expressed in binary format is received, which data is to be converted prior to transmission into a ternary format;

means to subdivide the binary data into groups of elements each consisting of m binary elements;

conversion means to which the groups of m binary elements are applied successively to be converted each into a group of n ternary elements, where n is less than m, so that the number of ternary elements which is transmitted is less than the number of binary elements in the original data, and where the number of different available ternary groups is greater than $2^m$ and more than $2^m$ of those groups are used in the data transmission;

a comparator which compares each said ternary group with its immediately preceding ternary group and causes the process of conversion to be modified, using more than $2^m$ of the available groups of ternary elements such that in the data as transmitted in the ternary format two consecutive and identical ternary groups do not occur; and an output over which the ternary groups generated in response to the reception of binary data over said input are transmitted.

It will be seen that the line code used in such a system embodies the advantages of both of the two arrangements referred to above.

In a preferred embodiment m=3 and n=2, and the data as transmitted after the conversion uses the following nine groups of three ternary element:

| | | |
|---|---|---|
| - - | 0+ | +0 |
| -0 | 0- | ++ |
| -+ | +- | 00 | eight of said groups being allocated to respective ones of the eight possible significations of three binary elements, the ninth being used to effect said modification of the conversion.

According to another aspect of the present invention there is provided a data transmission system, which includes:

an input over which data expressed in binary format is received, which data is to be converted prior to transmission into a ternary format;

means to subdivide the binary data into groups of elements each consisting of three binary elements;

conversion means to which the groups of three binary elements are applied successively to be converted each into a group of two ternary elements so that the number of ternary elements which is transmitted is less than the number of binary elements in the original data, wherein the following nine groups each of two ternary elements are available for data transmission:

| | | |
|---|---|---|
| - - | 0+ | +0 |
| -0 | 0- | ++ |
| -+ | +- | 00 | wherein each of the eight possible significations of three binary elements is converted into a respective one of eight of the said groups and wherein the ninth group is used to indicate a repetition, so that a succession of occurrences of the same group are sent in the form of that group alternating with said ninth group so that in the data as transmitted in ternary format two consecutive and identical ternary groups do not occur; and an output over which the ternary groups generated in response to the reception of binary data over said input are transmitted.

According to a further aspect of the present invention there is provided a method of data transmission, in which:

data to be transmitted is received in a binary format and is converted prior to transmission into a ternary format;

the data when in said binary format is sub-divided into groups each consisting of m binary elements, each said group of m binary elements being converted into a group of n ternary elements, where n is less than m, so that the number of ternary elements to be transmitted is less than the number of binary elements in the data as received;

the number of different available ternary groups is greater than $2^m$ and more than $2^m$ of these ternary groups are used in the transmission of the data; and the ternary groups are transmitted, and wherein each transmitted ternary group is compared with the immediately following ternary group and the process of binary to ternary conversion modified if necessary in such a way that in the data as transmitted two consecutive and identical ternary groups do not occur.

According to yet another aspect of the present invention there is provided a method of data transmission, in which:

data to be transmitted is received in a binary format and is converted prior to transmission into a ternary format;

the data when in said binary format is sub-divided into groups each consisting of three binary elements, each group of three binary elements being converted into a group of two ternary elements so that the number of ternary elements to be transmitted is less than the number of binary elements in the data as received;

the data as transmitted uses the following nine groups each of two ternary elements:

| | | |
|---|---|---|
| -- | 0+ | +0 |
| -0 | 0- | ++ |
| -+ | +- | 00 | eight of said groups being allocated to respective ones of the eight possible significations of the three binary elements, the ninth group being used to indicate a repetition so that a succession of occurrences of the same ternary element group is sent as that group alternating with said ninth group.

BRIEF DESCRIPTION OF THE DRAWINGS

FIG. 1 is an explanatory waveform which will be referred to in the course of the description, while

Figure 1:
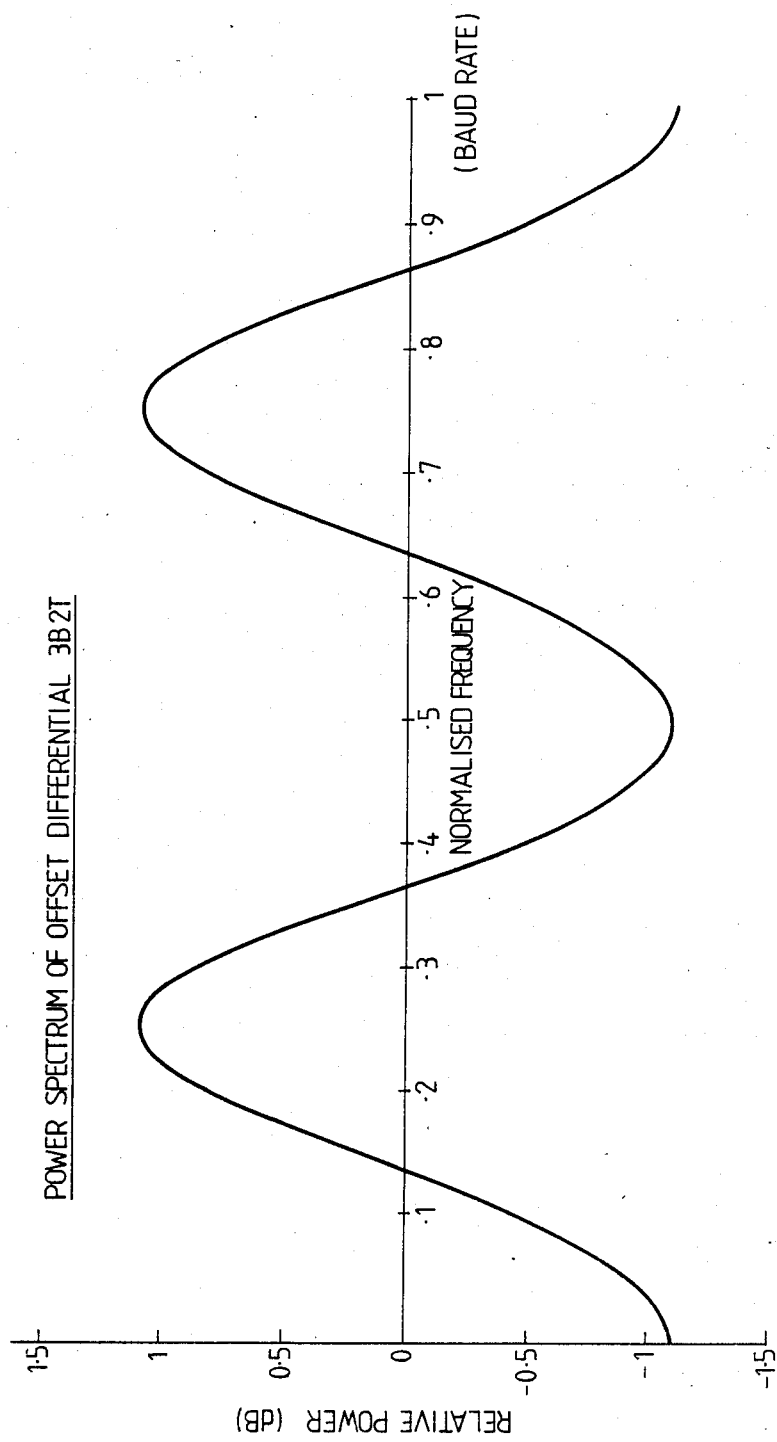

DESCRIPTION OF THE PREFERRED EMBODIMENTS OF THE INVENTION OFFSET DIFFERENTIAL 3B2T (OD3B2T) and SUBSTITUTIONAL 3B2T (SU3B2T)

The line code described in the present specification is suitable for use in a variety of applications, and particularly for transmission over twisted wire cables at data rates in the region of 144 bt/s. The line code used in this case is an improvement over the 3B2T code specified in U.S. Pat. No. 4,539,675 (D. A. Fisher). The code used in the present case offers improved performance when used in place of the previously specified code.

The modifications defined reduce the density of mark elements, and reduce the DC and half-baud rate power relative to the quarter-baud rate power. No two adjacent ternary duplets (i.e. pairs of elements) can be the same, i.e. a given ternary duplet is never repeated in consecutive positions. Hence unique framing words can be generated by repeating once or more any ternary duplet, which violates the normal coding rule. Another advantage of the line code described herein is that it enables a small reduction in the number of taps needed in echo cancellers and in digital feedback equalisers used in the system. In common with the previous version of 3B2T, the property that inversion of the ternary data stream corresponds to inversion of the binary data stream is retained.

OFFSET DIFFERENTIAL 3B2T (OD3B2T)

In this particular code, the new code word is given by the following expression:

$$T(i) := (T(i-1) + B(i) + K)$$

T(i) is the weight of the new two symbol ternary word or duplet to be transmitted.

T(i−1) is the weight of the previous two symbol ternary word transmitted.

K is the weight offset.

B(i) is the weight of the 3-bit binary word being encoded. + indicates that modulo 9 summation is used.

Weights of ternary and binary words are defined as follows:

| Weight | BINARY WORD | TERNARY WORD |
|---|---|---|
| 0 | 000 | -- |
| 1 | 001 | -0 |
| 2 | 010 | -+ |
| 3 | 011 | 0- |
| 4 | 100 | 00 |
| 5 | 101 | 0+ |
| 6 | 110 | +- |
| 7 | 111 | +0 |
| 8 | NOT APPLICABLE | ++ |

Decoding of offset differential ternary involves subtracting the weights of the two adjacent ternary words and the offset (K) to give the weight of the binary word transmitted. This subtraction is also done in modulo 9 arithmetic. Hence the decoding operation may be expressed as:

$$B(i) = T(i) \ominus T(i-1) \ominus K$$

where $\ominus$ indicates modulo 9 subtraction.

Properties of OD3B2T

When K=1, the offset differential 3B2T code (OD3B2T) has the property that no pair of adjacent ternary words can be identical. This results in the power vs frequency spectrum peaking at the quarter baud frequency and having a value at zero frequency and the half baud rate frequency 2.2 dB below the quarter baud rate value. The longest string of marks of the same sign is four, and the largest long term mean DC value is ¾ of the mean DC magnitude of positive or negative mark. The peak to peak excursions of an AC coupled transmitted signal will therefore in general be reduced by approximately 1 dB compared to completely random ternary data with the same pulse shaping.

Assuming random input binary data, all ternary duplets have equal probability of occurrence resulting in a mean density of marks of ⅔. The auto-correlation function for the code is zero for all odd symbol spaced time differences and for even symbol spaced time differences of i has value:

$$A(i)=(-0.125)^{|i/2|} \text{ (i even only)}$$

where $|i/2|$ is the modulus of i/2.

The code power spectrum resulting from this auto-correlation function is shown in the accompanying FIG. 1. Because no two adjacent ternary duplets can be the same, duplet or word synchronisation can be found in the receiver by counting the occurrence of adjacent duplets that correspond between even word boundaries and odd word boundaries. The correct duplet boundary in error free data results in no two adjacent duplets being the same. In the example below, the ternary data sequence in the centre has duplet word synchronisation valid between odd boundaries. Between even boundaries adjacent duplets violate the coding rule twice with + − + − and 0000, e.g.

| BINARY INPUT | | TERNARY OUTPUT |
|---|---|---|
| Weight | Elements | |
| 0 | 000 | − − |
| 1 | 001 | − 0 |
| 2 | 010 | − + |
| 3 | 011 | 0 + |
| 4 | 100 | 0 − |
| 5 | 101 | + − |
| 6 | 110 | + 0 |
| 7 | 111 | + + |

If the code translation output duplets are T(0), T(1), T(2) ... T(n) then the ternary duplet "00" is substituted such that:

If T(0) = T(1) then T(1) : = "00"
If T(2) = T(1) then T(2) : = "00"
.
.
.
If T(n) = T(n-1) then T(n) : = "00"

(where the symbol ":=" represents assignment of the value to the duplet defined).

| Element no. | 1 2 3 4 5 6 7 8 9 0 1 2 3 4 5 6 |
| Odd Boundary duplets | \| \| \| \| \| \| \| \| \| |
| Ternary elements | |
| Even boundary duplets | + − 0 + − + − 0 + − + 0 0 0 0 + |
| | \| \| \| \| \| \| \| \| |

The effect of a single ternary error in a received code word is to introduce an error into the weights deduced from the difference between ternary words of both forward and backward differences. This results in a doubling of the binary error rate compared to an ideal ternary coder. The bode is insensitive to ternary data inversion.

Frame synchronisation words may use violations of the coding rule by repeating ternary duplets. Therefore up to nine different framing words of length four are possible. Frame synchronisation words consisting of two or more repeated ternary duplets (e.g. "000000") are unique provided word synchronisation is known. A binary termination to a five or six zero synchronisation word also provides unambiguous word synchronisation, (e.g. the synch. word "000000B" where B is a binary bit is unique). The binary bit may be used to convey information at the frequency of the synch. word (such as a cyclic redundancy check on the data). It may also be used to give super-frames by being set to 0 every n'th frame.

SUBSTITUTIONAL 3B2T (SU3B2T)

A coder can be implemented to give the same power spectrum and signal properties as OD3B2T but using a fixed look-up table translating the eight binary words to eight of the nine ternary duplets with the ninth ternary duplet substituted where a ternary duplet would otherwise be duplicated.

Any one-to-one mapping of binary triplets to ternary duplets may be used for this conversion, but the table given has low error multiplication (incorrectly received single ternary bits result in a low number of binary errors) and the property that ternary sign inversion leads to binary sign inversion.

Note that in the case of a long series of repeated binary triplets, for example "011 011 011 011", the substitution is made on every second occurrence since after the first assignment of the ternary word "00" to the second ternary word, the third ternary word is compared to "00" which does not occur in the simple binary to ternary conversion. The ternary sequence in this case would therefore be "0+ 00 0+ 00".

Properties of SU3B2T

This code has essentially the same spectral properties and ternary duplet statistics and auto-correlation as OD3B2T when the binary data sequence is random, with the following exceptions:

(a) The code is sign sensitive and where the signalling voltages + and − become inverted, the polarity needs to be determined by a separate test.

(b) An error in a ternary duplet only affects the binary triplet to which it is translated when the duplet is followed by "00". Therefore, the error multiplication is only increased marginally compared to the case where the translation table is used without substitution of repeated duplets. This gives lower error multiplication for single errors than OD3B2T.

Implementation of the Coder (FIG. 2) for SU3B2T

The implementation requires binary to ternary conversion logic, which can follow well-established principles. Three binary inputs B(1), B(2) and B(3) are latched and the ternary conversion performed, see FIG. 2.

The four sign and magnitude outputs from the conversion table in the translation block are compared in the comparator with the four previous encoder outputs for equivalence. The comparison operation is also performed in well-known manner. The four binary sign and magnitude values forming the last output were stored in 'D-type' logic storage elements D1, D2, D3 and D4, whose corresponding outputs Q1, Q2, Q3, Q4 provide the logic outputs H, G, F, E. These outputs are also fed back to the E, F, G, H inputs of the comparator. In the case of the binary to ternary translator output corresponding to the previous ternary duplet, the comparator sends a signal over the connection shown to reset the D-type elements to their low states corresponding to the ternary duplet "00".

The comparator logic may for example use four two-input EXCLUSIVE NOR gates, each output forming the input to a four input NAND gate the output of which is the comparator output.

If [(S(i)=S(i−2) and M(i)=M(i+1) and S(i+1)=S(i−1) and M(i+1)=M(i−1)] then the comparator output will be low and causes the four latches Q1, Q2, Q3, Q4 to be reset to 0. In the case of the comparator output being high, the latches D1 to D4 load the ternary words output directly from the code translator.

Decoding

The decoding translates all ternary duplets to the corresponding binary triplet except where the ternary duplet is "00". In this case the most recent triplet is repeated.

Figure 2:
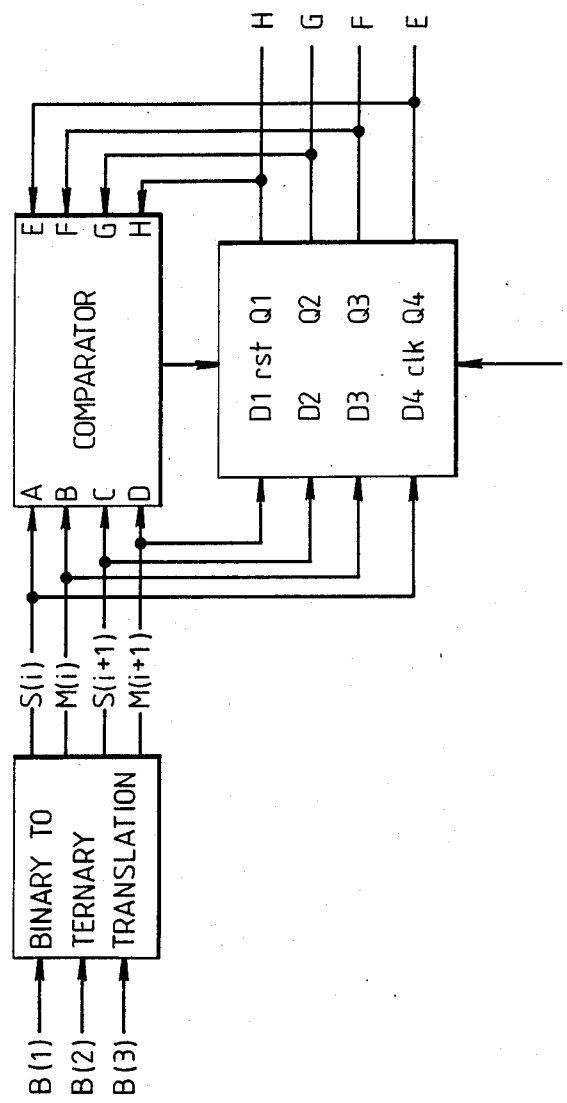
FIG. 2 is a simplified block schematic of a circuit using one form of the invention.

Reverting to FIG. 2, it will be noted that the output of the translation circuit include four leads; two of these S(i), M(i) for the first ternary element while the other two, S(i+1), M(i+1) are for the other ternary element. For each of these pairs of leads we have the following significances:

(a) For ternary +1, S=1 and M=0
(b) For ternary 0, S=0 and M=0
(c) For ternary −1, S=0 and M=−1

Figure 3:
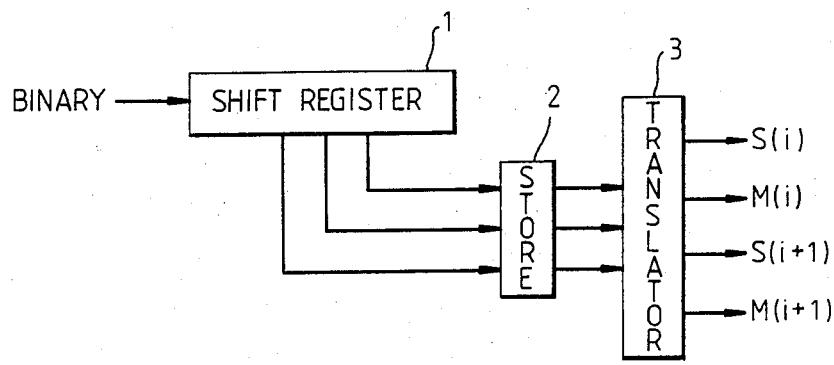
FIGS. 3, 4 and 5 are simplified representations of some of the circuit items used in the 'boxes' of FIG. 2.
Figure 4:
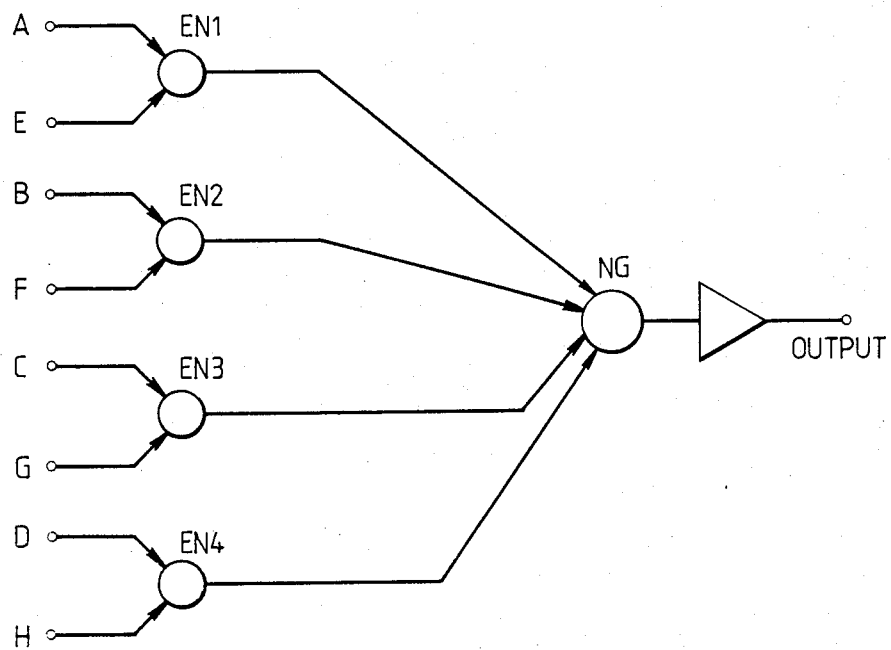
Figure 5:
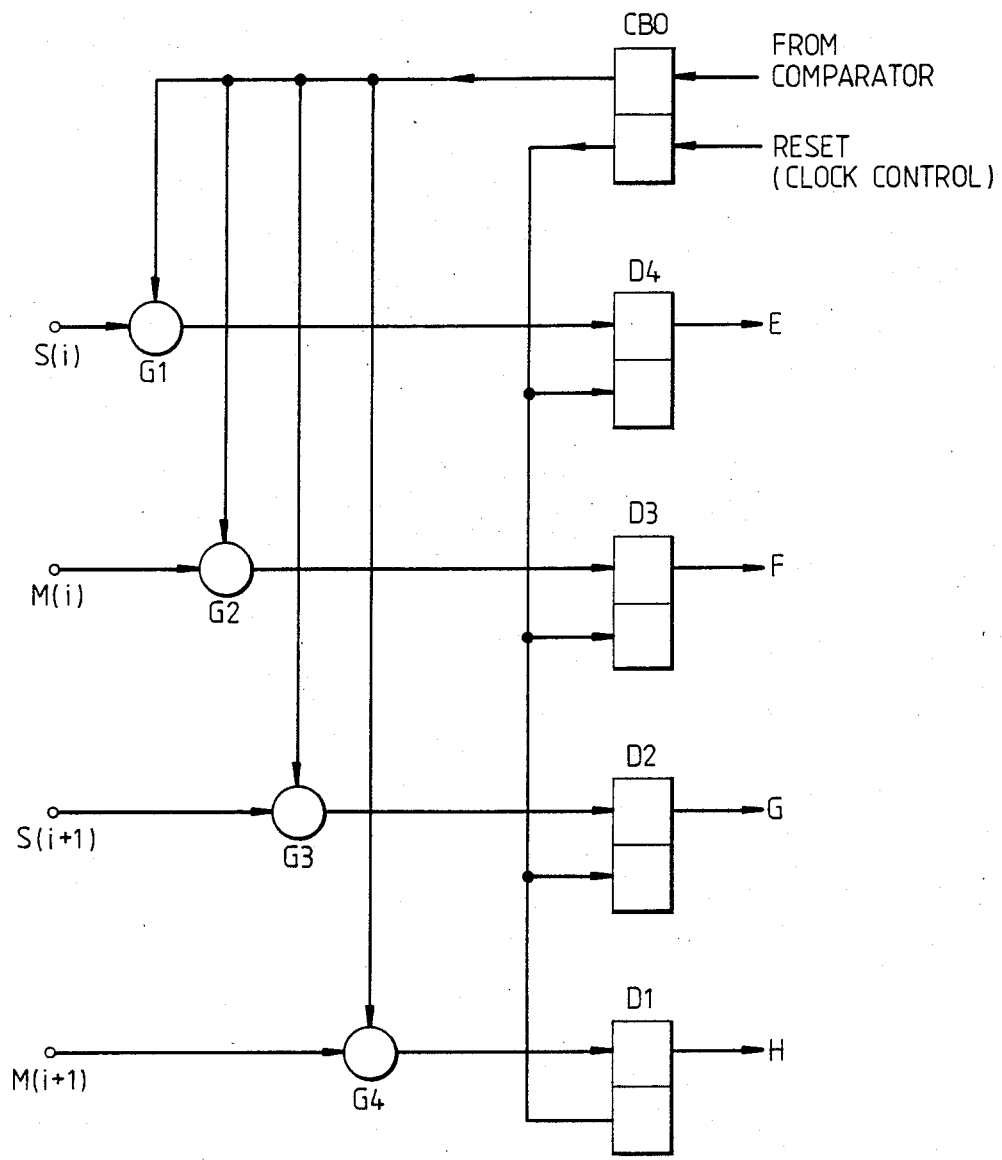

Now we consider FIGS. 3 to 5 which show certain portions of the circuitry of FIG. 2; these figures are highly schematic, but serve to indicate the operational principles of these portions.

In FIG. 3, we see an input over which a binary bit stream is received, the binary bits entering a three bit shift register 1. After each set of three bits has entered the register, that set of bits is transferred parallel-fashion under clock control to a store 2. This store's outputs go to the translator 3, whose outputs are S(i), M(i), S(i+1) and M(i+1). It will be noted that the principles of operation of this circuit follow those of U.S. Pat. No. 3,611,141 (Waters), referred to above.

The essential portion of the comparator, FIG. 4, consist of four EXCLUSIVE or gates EN1 to EN4. These compare the current translation into ternary, which appears on leads A to D, with the preceding ternary group which appear on leads E to H. The outputs of these go to a NAND gate NG which gives a high output if the two groups do not match. These leads A to D and E to H correspond to the connections A to D and E to H of FIG. 2.

We now refer to FIG. 5; here the ternary group from the translator is applied via four gates G1 to G4 to four latches D1 to D4. There is also an input from the comparator which, if the output indicates non-match enables the gates G1 to G4 via a bistable CBO. This gate enablement then sets the bistables D1 to D4, whose outputs E,F,G,H form the output to the line transmission means. This latter is not shown as it follows established practice.

Thus if the current ternary group differs from the preceding ternary group, the current group passed via the gates to the latches and therefrom to the outputs E to H. If the two groups do not match there is no input to CBO which thus remains in the off state. CBO is reset off under clock pulse control before each comparison operation. When this occurs, the repeat indication is given, as already described.

The Store and the Translator shown in FIG. 3 are both within the box labelled BINARY TO TERNARY TRANSLATION in FIG. 2, the outputs S(i), M(i), S(i+1) and M(i+1) corresponding to the similarity labelled outputs from that box in FIG. 2. The shift Register is, in effect, to the left of the box in FIG. 2 just mentioned, where it acts as a serial-to-parallel translator, its outputs forming the inputs to the store.

Thus each group of three binary elements enters the Shift Register from which it is output in parallel-fashion to the Store. The outputs of this store form the inputs to the Translator, the essential parts of which are shown in FIG. 5.

The gating network in FIG. 4, which is a comparator, represents the functional parts of the COMPARATOR shown in FIG. 2. Its output is the output which in FIG. 2 goes from the COMPARATOR box to the box immediately below it.

The circuit elements shown in FIG. 5 are in the box below the COMPARATOR box in FIG. 1. The inputs S(i), M(i), M(i+1) and S(i+1), which comes from the BINARY TO TERNARY TRANSLATION box, correspond to the similarity labelled outputs from that box in FIG. 2. In addition, the outputs E,F,G and H correspond respectively to the simarly-labelled outputs of the box in FIG. 2.

The input to CBO, labelled 'From Comparator' is the above-mentioned output from the comparator which appears in FIG. 2. The Reset (Clock Control) input to CBO in FIG. 5 is the input to the bottom of the lowermost box in FIG. 2.

In view of the functional description given in respect of FIG. 2 it is felt that no further description of FIGS. 3, 4 and 5 is needed.

Implementation of the coder (FIG. 6) for OD3B2T

Figure 6:
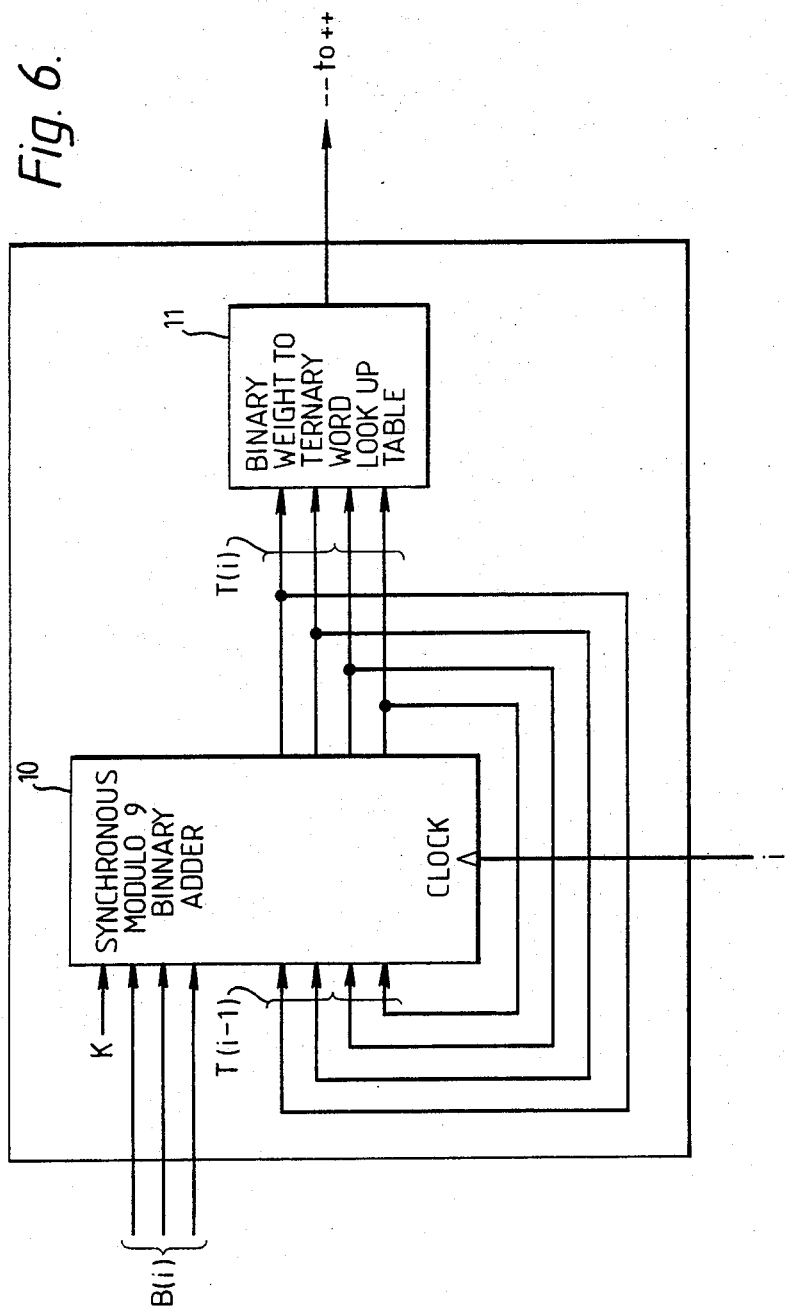
FIG. 6 is a simplified block schematic of a circuit using another form of the invention.

FIG. 6 illustrates an arrangement for coding according to the expression:

$$T(i): = (T(i-1) \oplus B(i) \oplus K)$$

From a received binary bit stream sets of three bits are taken (as described above) and then the binary weights (B(i)) corresponding to these three bits are taken and input to a synchronous modulo 9 binary adder 10 together with k and four binary weights obtained from the preceding set of three bits (T(i−1)). The output of adder 10 corresponds to four binary weights T(i). These weights T(i) are then applied to a binary weight to ternary word look up table 11 whose output is the appropriate ternary word between −− and ++.

I claim:

1. A data transmission system, which includes:
an input over which data expressed in binary format is received, which data is to be converted prior to transmission into a ternary format;
means to subdivide the binary data into groups of elements each consisting of m binary elements, where m is a first integer;
conversion means to which the groups of m binary elements are applied successively to be converted back into a group of n ternary elements, where n is a second integer and is less than m, so that the number of ternary elements which is transmitted is less than the number of binary elements in the confined data, and where the number of different available ternary groups is greater than $2^m$ and more than $2^m$ of those groups are used in the data transmission;

a comparator which compares each said ternary group with its immediately preceding ternary group and causes the process of conversion to be modified, using more than $2^m$ of the available groups of ternary elements such that in the data as transmitted in the ternary format two consecutive and identical ternary groups do not occur; and an output over which the ternary groups generated in response to the reception of binary data over said input are transmitted.

2. A system as claimed in claim 1, wherein m=3 and n=2, wherein the data as transmitted after said conversion uses the following nine groups each of two ternary elements:

| | | |
|---|---|---|
| − − | 0+ | +0 |
| −0 | 0− | ++ |
| −+ | +− | 00 | eight of said groups being allocated to respective ones of the eight possible significations of three binary elements, the ninth being used to effect said modification of the conversion.

3. A data transmission system, which includes:

an input over which data expressed in binary format is received, which data is to be converted prior to transmission into a ternary format;

means to subdivide the binary data into groups of elements each consisting of three binary elements;

conversion means to which the groups of three binary elements are applied successively to be converted each into a group of two ternary elements so that the number of ternary elements which is transmitted is less than the number of binary elements in the original data, wherein the following nine groups each of two ternary elements are available for data transmission:

| | | |
|---|---|---|
| − | 0+ | +0 |
| −0 | 0− | ++ |
| −+ | +− | 00 | wherein each of the eight possible significations of three binary elements is converted into a respective one of eight of the said groups and wherein each conversion operation takes into account the result of the preceeding operation so that in the data as transmitted in ternary format two consecutive and identical ternary groups do not occur; and an output over which the ternary groups generated in response to the reception of binary data over said input are transmitted.

4. A system as claimed in claim 3, wherein successive sets of three binary elements are coded into pairs of ternary elements in accordance with the equation:

$$T(i): = (T(i-1) \oplus B(i) \oplus K)$$

where T(i) is a weight assigned to a new ternary pair, T(i) is a weight assigned to a previously sent ternary pair, B(i) is a weight assigned to the set of three binary elements being encoded, and K=1, where K is the weight offset, the symbol $\oplus$ indicating that summation is effected modulo 9.

5. A system as claimed in claim 4, wherein decoding the ternary pairs into three elements binary groups involves subtracting the weights of the two adjacent ternary pairs and the offset to give the weight of the binary group, so that the decoding operation is expressed as:

$$B(i) = T(i) \ominus T(i-1) \ominus K$$

where B(i) is the binary group, T(i) is the weight assigned to previous ternary pair and K is the weight offset, the symbol $\ominus$ indicating that the subtraction is effected modulo 9.

6. A system as claimed in claim 5, wherein frame synchronisation is effected by violating the coding rule by repeating ternary pairs of elements to form a synchronisation word.

7. A system as claimed in claim 6, wherein a binary bit is appended to a five or six bit zero synchronisation word to provide unambiguous word synchronisation, i.e. the synchronisation word is TTTTTB or TTTTTTB, T being a zero ternary element and B being a binary bit.

8. A system as claimed in claim 7, wherein the said binary bit appended to the synchronisation words is used to convey information at the frequency of the synchronisation word, or to give a super frame by being set to 0 every n'th frame.

9. A system as claimed in claim 1, wherein m=3 and n=2 and wherein the respective groups of three binary elements are converted into pairs of ternary elements in accordance with the following table:

| BINARY INPUT | | TERNARY OUTPUT |
|---|---|---|
| Weight | Elements | |
| 0 | 000 | − − |
| 1 | 001 | − 0 |
| 2 | 010 | − + |
| 3 | 011 | 0 + |
| 4 | 100 | 0 − |
| 5 | 101 | + − |
| 6 | 110 | + 0 |
| 7 | 111 | + + | and wherein the ninth ternary pair which is used as a repeat indication is 0 0.

10. A method of data transmission, in which:

data to be transmitted is received in a binary format and is converted prior to transmission into a ternary format;

the data when in said binary format is subdivided into groups each consisting of m binary elements, where m is a first integer, each said group of m binary elements being converted into a group of n ternary elements where n is a second integer and is less than m, so that the number of ternary elements to be transmitted is less than the number of binary elements in the data received;

the number of different available ternary groups are greater than $2^m$ and more than $2^m$ of those ternary groups is used in the transmission of the data; and the ternary groups are transmitted, and wherein each transmitted ternary group is compared with the immediately following ternary group and the process of binary to ternary conversion modified if necessary in such a way that in the data as transmitted two consecutive and identical ternary groups do not occur.

11. A method as claimed in claim 10, in which m=3 and n=2, and in which:

the data as transmitted after the conversion into the ternary format uses the following nine groups each of two ternary elements:

| | | |
|---|---|---|
| − − | 0+ | +0 |
| −0 | 0− | ++ |
| −+ | +− | 00 | eight of said groups being allocated to respective ones of the eight possible significations of the three binary elements, the ninth being used to effect said conversion modification.

12. A method as claimed in claim 11, in which:

the respective groups of three binary elements are converted into pairs of ternary elements in accordance with the following table:

| BINARY INPUT | | TERNARY OUTPUT |
|---|---|---|
| Weight | Elements | |
| 0 | 000 | − − |
| 1 | 001 | − 0 |
| 2 | 010 | − + |
| 3 | 011 | 0 + |
| 4 | 100 | 0 − |
| 5 | 101 | + − |
| 6 | 110 | + 0 |
| 7 | 111 | + + | and the ninth ternary pair which is used as said repeat indication is 00.

13. A method of data transmission, in which:

data to be transmitted is received in a binary format and is converted prior to transmission into a ternary format;

the data when in said binary format is subdivided into groups each consisting of three binary elements, each group of elements being converted into a group of two ternary elements so that the number of ternary elements to be transmitted is less than the number of binary elements in the data as received;

the data as transmitted uses the following nine groups each of two ternary elements:

| | | |
|---|---|---|
| − − | 0+ | +0 |
| −0 | 0− | ++ |
| −+ | +− | 00 | eight of said groups being allocated to respective ones of the eight possible significations of the three binary elements; and wherein each conversion operation takes into account the results of the preceeding operation, so that in the data as transmitted in ternary format two consecutive and identical ternary groups do not occur.

14. A method as claimed in claim 13, wherein successive sets of three binary elements are coded into pairs of ternary elements in accordance with the equation:

$$T(i):=(T(i-1)\oplus B(i)\oplus K)$$

wherein $T(i)$ is a weight assigned to a new ternary pair, $T(i-1)$ is a weight assigned to previously sent ternary pair, $B(i)$ is a weight assigned to the set of three binary elements being encoded, and $K=1$, where K is a weight offset, the symbol $\oplus$ indicating that summation is effected module 9.

* * * * *